Aug. 23, 1927.　　　　　E. H. ANGIER　　　　　1,640,021
METHOD OF PACKAGING TORIC ARTICLES
Filed March 28, 1921
*Fig. 1.*
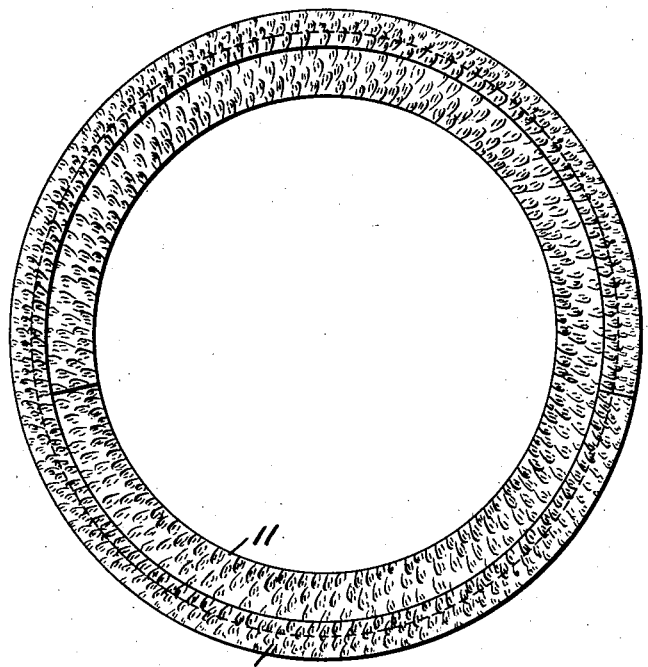
*Fig. 3.*
*Fig. 2.*
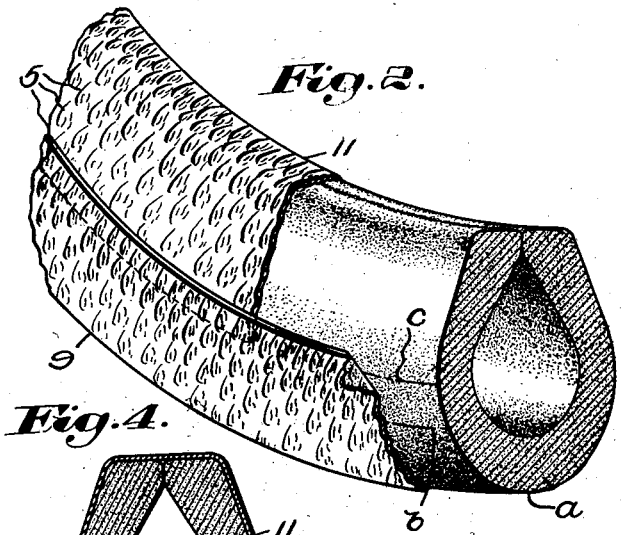
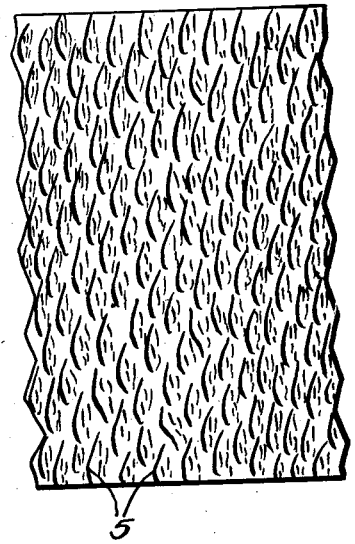
*Fig. 4.*
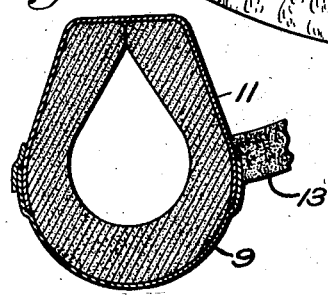
Inventor:
Edward H. Angier,
by Emery, Booth, Janney & Varney,
Attys.

Patented Aug. 23, 1927.

1,640,021

UNITED STATES PATENT OFFICE.

EDWARD H. ANGIER, OF FRAMINGHAM, MASSACHUSETTS.

METHOD OF PACKAGING TORIC ARTICLES.

Application filed March 28, 1921. Serial No. 456,407.

This invention relates to packages and designs to provide a method for fitting an article with a covering of wrapping material closely conforming thereto. It is applicable to those articles having a longer outer dimension and a shorter inner dimension, which may be referred to as toric, that word denoting a solid which may be considered as produced by the revolution of a figure about an axis exterior thereto. Examples of such articles are coils of wire and the shoes of vehicle tires, in which case the revolution is a complete one and the article is annular.

My invention may be understood from the following description of an embodiment thereof taken in connection with the accompanying drawings, wherein:

Fig. 1 is a side elevation of a pneumatic vehicle tire enclosed in a wrapping illustrative of my invention;

Fig. 2 is a diagrammatic, fragmentary perspective view of a portion of the wrapped tire with parts successively broken away;

Fig. 3 is a plan view of a portion of the wrapping material preferably used; and Fig. 4 is a section of a tire with a slightly modified form of wrapping.

As I anticipate a major field of usefulness for my invention in packaging the shoes of pneumatic vehicle tires and have illustrated such a shoe or tire in the drawing. I shall for convenience in the following description refer specifically to a tire as the article enclosed.

In wrapping a tire or other ring shaped body difficulties are encountered in making a smooth fitting wrapping because distances measured along various parts of the tire are markedly different as contrasted with an article of block-like form, the surface of which consists of a number of planes which can be fitted with a sheet of wrapping material such as paper by a simple folding or bending of the same. In accordance with my present invention, therefore, I utilize wrapping material capable of expansion in localized areas or zones thereof to permit it to be shaped to the tire. Referring to Fig. 3, I have there shown a material suitable for the purpose consisting of one or more thicknesses of heavy paper suitably prepared to provide for local extensibility. This is most conveniently effected through a craping process providing irregular resilient embossments 5 throughout the area of the paper. The various gatherings or crapes may be stretched out, moreover, against their natural resiliency without substantially affecting the crapings or gatherings of adjacent areas and the wrapping material thus changed from its normally flat shape.

In accordance with my invention I utilize a band or strip of material such as described preferably provided with transverse crapings which extend throughout the entire area thereof, as indicated in Fig. 3, the entire strip being expansible and no part thereof being restrained either because it is itself unprovided with stretchable embossments or because it is restrained by any added element. This is essential to permit articles of varying form and size to be successfully wrapped.

Referring to Figs. 1 and 2, I may provide a strip 9 of craped or similarly prepared material which has a considerable range of extensibility and is of suitable width and apply it lengthwise along one of the circumferences of the tire, such as the outer circumference or tread. Then by stretching the central portion of the band 9 it is expanded relatively to the side edges and assumes a cup-like or channel form which permits it to be fitted over and conform to the double curvature of the tire and closely fit the same although the circumference thereof measured along the tread at $a$ in Fig. 2 is markedly greater than the circumference measured along the line $b$ or the line $c$. In Fig. 2 I have attempted to indicate the differential expansion but it will be understood that the disclosure is diagrammatic and in particular that the form and size of the embossments 5 are conventionalized and exaggerated. The strip 9 is made of such length as to completely encircle the tire.

I have here described the strip 9 as applied to the outer circumference of the tire and having its central portion extended and in combination therewith a strip 11 is utilized applied along the inner circumference or bead side of the tire and having its edges expanded relatively to the central portion. The strip 9 extending over the outer circumference is of such width as to reach substantially to the widest part of the tire measured transversely of the same and the strip 11 of such width as to extend upwardly from the inner circumference to that point. By this arrangement the most perfect adaptation of the covering to the shape of the article is provided for. Preferably the strip 9 is overlapped on the strip 11 to bind down the edge of the same. When the central zone of the strip 9 is expanded to fit the shape of the tire it assumes a natural cupped shape and its edges hug the sides of the tire and may serve firmly to secure the expanded edges of the strip 11. The edges of the two strips 9 and 11 may be sealed together directly as shown or, if desired, I may utilize sealing strips 13 as shown in Fig. 4, these extending circumferentially and being adhesively secured to the oppositely presented edges of the strips 9 and 11 and joining the two. These strips 13 are conveniently also made of craped paper as this permits the outer edge to expand relatively to the inner edge of the strip as a whole so that the strip will conform to the circle of the tire. In Fig. 4 I have shown a portion of one of the strips 13 turned back to indicate its nature.

I wish to emphasize that the wrapping strip or strips as 9 or 11 are of substantially uniform character throughout and are stretchable or resilient throughout their area. On a large tire, for example, the difference in length between the circumferences $a$ and $b$, referring to Fig. 2, is greater than the difference between the homologous circumferences in a smaller tire and in articles of varying size and shape the conditions met with are constantly varying. Thus if the wrapping material were fixed in some dimension, it is possible that it would be adapted for a given purpose if the expansibility of the remaining portion were exactly determined but if the same material were then applied to an article of different size or shape it could not be made to conform thereto. Within a wide range determined by the initial expansiblity of the material unrestrained gatherings throughout the area thereof permit the me strip to be adapted to articles of different size or different shape as each portion may expand differentially in order to adapt the material to the article which is to be enclosed. Thus, if the craping process were carried on so that the paper could be stretched out to twice its length and considering a strip such as 9 in Fig. 2, provision would be made for covering an article in which the circumference $a$ was twice the circumference $c$ and this would be effected without stretching the edge of the strip. For this expansion and for any intermediate case in which the center line of the paper would be less extended would correspond certain definite curvatures of the strip. Since the strip, however, is expansible throughout its area, the edges also could be expanded to permit the strip to be fitted to an article having the same maximum circumference but a different curvature.

The present application is subsidiary to my copending application Serial No. 136,338, filed Sept, 18, 1926, as a division of the present application, and the claims herein are specific to a construction similar to that shown in the drawings in that two strips of paper are utilized in forming the covering.

Having thus described the form of my invention shown by way of example in the accompanying drawings, what I claim as new and desire to secure by Letters Patent I shall express in the following claims:

1. The method of packaging toric articles which comprises applying along the inner and outer circumferences of the article respectively strips of wrapping material capable throughout its width of substantially unrestrained local expansion longitudinally thereof, differentially expanding the strips to fit them around the article to cover at least a large portion of its cross-sectional perimeter and securing them together.

2. A package comprising a ring shaped article and a covering comprising a pair of strips extending along the inner and outer circumferences thereof respectively having resilient gatherings locally expanded longitudinally thereof whereby they are conformed to the shape of the article and joined along the sides of the article.

In testimony whereof, I have signed my name to this specification.

EDWARD H. ANGIER.